United States Patent
Li et al.

(10) Patent No.: US 9,910,893 B2
(45) Date of Patent: Mar. 6, 2018

(54) FAILOVER AND RESUME WHEN USING ORDERED SEQUENCES IN A MULTI-INSTANCE DATABASE ENVIRONMENT

(75) Inventors: Fulu Li, Foster City, CA (US); Atsushi Morimura, Foster City, CA (US); Michael Zoll, Foster City, CA (US); Vineet Marwah, San Ramon, CA (US); Amit Ganesh, San Jose, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 273 days.

(21) Appl. No.: 13/309,300

(22) Filed: Dec. 1, 2011

(65) Prior Publication Data
US 2013/0144842 A1    Jun. 6, 2013

(51) Int. Cl.
G06F 7/00    (2006.01)
G06F 17/30   (2006.01)

(52) U.S. Cl.
CPC .............................. *G06F 17/3048* (2013.01)

(58) Field of Classification Search
CPC .... H04L 69/40; G06F 11/2092; G06F 12/084; G06F 12/0846; G06F 12/06
USPC ...... 707/649–650; 714/4.11, 6.3, 39, 51, 4.3
See application file for complete search history.

(56) References Cited

U.S. PATENT DOCUMENTS

| 5,784,623 A | 7/1998 | Srinivasan |
| 7,089,356 B1 | 8/2006 | Chen et al. |
| 7,103,597 B2 | 9/2006 | McGoveran |
| 7,136,967 B2 | 11/2006 | Sawdey |
| 7,873,602 B2 * | 1/2011 | Debrunner ........ G06F 17/30575 707/610 |
| 8,068,114 B2 | 11/2011 | Andre et al. |
| 8,117,392 B2 | 2/2012 | Charney et al. |
| 8,626,709 B2 | 1/2014 | Isaacson et al. |
| 2005/0100017 A1 * | 5/2005 | Williams et al. ............. 370/394 |
| 2005/0159927 A1 * | 7/2005 | Cruz ...................... G06F 9/465 702/188 |

(Continued)

OTHER PUBLICATIONS

Maurice Herlihy, "Wait-Free Synchronization", ACM Transactions on Programming Languages and Systems, vol. 11, No. 1, Jan. 1991.

(Continued)

*Primary Examiner* — Tony Mahmoudi
*Assistant Examiner* — Linh Black
(74) *Attorney, Agent, or Firm* — Vista IP Law Group, LLP

(57) ABSTRACT

An approach is disclosed for implementing failover and resume when using ordered sequences in a multi-instance database environment. The approach commences by instantiating a first database instance initially to serve as an active instance, then instantiating a second database instance to serve as an instance of one or more passive instances. The active database establishes mastership over a sequence and then processes requests for the 'next' symbol by accessing a shared sequence cache only after accessing a first instance semaphore. The active instance and the passive instance perform a protocol such that upon passive database detection of a failure of the active database, one of the passive database instances takes over mastership of the sequence cache, and then proceeds to satisfy sequence value requests. The particular order is observed in spite of the failure.

17 Claims, 7 Drawing Sheets

(56) References Cited

U.S. PATENT DOCUMENTS

| | | | |
|---|---|---|---|
| 2005/0172161 A1* | 8/2005 | Cruz | G06F 11/2028 |
| | | | 714/4.11 |
| 2005/0220112 A1* | 10/2005 | Williams et al. | 370/394 |
| 2006/0095478 A1* | 5/2006 | Cherkauer | G06F 11/1662 |
| 2006/0101207 A1 | 5/2006 | Nakazato | |
| 2006/0117212 A1* | 6/2006 | Meyer et al. | 714/4 |
| 2006/0190453 A1* | 8/2006 | Colrain et al. | 707/8 |
| 2007/0143766 A1 | 6/2007 | Farchi et al. | |
| 2008/0201523 A1* | 8/2008 | Ash et al. | 711/113 |
| 2008/0244307 A1* | 10/2008 | Dasari et al. | 714/4 |
| 2010/0082540 A1* | 4/2010 | Isaacson et al. | 707/624 |
| 2010/0198920 A1* | 8/2010 | Wong et al. | 709/206 |
| 2010/0250856 A1* | 9/2010 | Owen et al. | 711/128 |
| 2011/0019550 A1* | 1/2011 | Bryers et al. | 370/235 |
| 2011/0285731 A1 | 11/2011 | Andre et al. | |
| 2011/0289263 A1* | 11/2011 | McWilliams et al. | 711/103 |
| 2012/0011391 A1* | 1/2012 | Callaway et al. | 714/4.11 |
| 2012/0116696 A1* | 5/2012 | Wank | G01R 31/42 |
| | | | 702/58 |
| 2012/0233496 A1* | 9/2012 | Gil et al. | 714/4.11 |
| 2012/0303908 A1 | 11/2012 | Dantzig et al. | |
| 2015/0019803 A1 | 1/2015 | Miller et al. | |

OTHER PUBLICATIONS

Notice of Allowance and Fees Due dated Jun. 6, 2014 for U.S. Appl. No. 13/627,808.

Non-final Office Action dated Jul. 10, 2014 for U.S. Appl. No. 13/309,394.

Non-final Office Action dated Aug. 15, 2014 for U.S. Appl. No. 13/309,356.

Non-final Office Action dated Jan. 28, 2014 for U.S. Appl. No. 13/627,808.

Final Office Action dated Dec. 4, 2014 for U.S. Appl. No. 13/309,394.

Non-final Office Action dated Feb. 2, 2015 for U.S. Appl. No. 13/309,356.

Advisory Action dated Mar. 3, 2015 for U.S. Appl. No. 13/309,394.

Notice of Allowance and Fees Due dated Apr. 20, 2015 for U.S. Appl. No. 13/309,394.

Notice of Allowance and Fee(s) Due dated Jun. 24, 2015 for U.S. Appl. No. 13/309,356.

\* cited by examiner

FAILOVER AND RESUME WHEN USING ORDERED SEQUENCES IN A MULTI-INSTANCE DATABASE ENVIRONMENT

RELATED APPLICATIONS

The present application is related to co-pending U.S. patent application Ser. No. 13/309,394, entitled "REDUCING SEQUENCE CACHE LATCH CONTENTION IN A DATABASE SYSTEM" and U.S. patent application Ser. No. 13/309,356, entitled "GENERATING AN ORDERED SEQUENCE IN A DATABASE SYSTEM USING MULTIPLE INTERLEAVED CACHES", both filed on even date herewith, which are both hereby incorporated by reference in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosure relates to the field of databases and more particularly to techniques implementing failover and resume when using ordered sequences in a multi-instance database environment.

BACKGROUND

Some embodiments of the present disclosure are directed to an improved approach for implementing failover and resume when using ordered sequences in a multi-instance database environment. More particularly, disclosed herein according to some embodiments are a method and system for implementing failover and resume when using ordered sequences in a multi-instance database environment.
Overview of Ordered Sequences In a modern database system for processing transactions (e.g., commercial transactions such as purchase orders, debits, credits, etc.) many users can use the system at the same time, and many users may have the same sorts of operations to perform. For example, if a user, say User A, desires to process a batch of purchase orders, he or she might want to assign each one of those purchase orders in the batch a unique number. And, it might be desired to assign those purchase orders a unique number within a contiguous sequence (e.g., PO-0001, PO-0002, PO-0003, etc.).

One technique is to assign a large range of contiguous values for all users to access and 'check-out' a contiguous sequence. For example, if User A desired to process a batch of say, 20 purchase orders, he or she might request a sequence comprising 20 contiguous values (e.g., 0001, 0002, 0003, . . . 0020). However a different user, say User B, might at the same time also desire to process a batch of purchase orders, and could at the same time request a sequence comprising 20 contiguous values. One legacy technique for ensuring that User A and User B do not receive the same sequence comprising 20 contiguous values is to force all requests to be serialized. There are various techniques for serialization of requests, often involving serialization of requests using a flag or latch (or any implementation of a semaphore). In such a case for using a flag or latch, a first user (say User A) is granted access to the list of contiguous sequences, while any next users must wait. Then the first user is given the requested sequence (in this example, numbers 0001-0020), and the next waiting user's request is then processed. Given that the first user's request was satisfied (thus, the next available would be 0021) the first waiting user's request (e.g., a sequence of 20 contiguous values) can be satisfied by returning the sequence 0021, 0022, 0023 through 0040, and so on.

Many application environments operate on mission-critical data that might need the aforementioned ordered sequences, and resilience and redundancy are provided by implementing database environments comprising multiple instances of a database, each of which instance might share at least some of the same components provided in the environment. When a failure does occur, some mission-critical applications need a "graceful" failover from one database instance to another database instance. Similarly, after a failed component has been repaired or replaced, the mission-critical applications need a "graceful" resume. The sense of "graceful" here includes the sense of a satisfactory restoration after failure/resume and the sense of satisfactory performance before, during, and after a failure.

Some techniques have been tried where entire checkpoints are taken periodically and saved in order to be resumed after a failure, however, such techniques do not have the capabilities to perform "gracefully" in general, nor do the aforementioned techniques have the capability to implement "graceful" failover and resume operations.

Therefore, there is a need for an improved approach for implementing failover and resume when using ordered sequences in a multi-instance database environment.

SUMMARY

The present disclosure provides an improved method, system, and computer program product suited to address the aforementioned issues with legacy approaches. More specifically, the present disclosure according to some embodiments provides a detailed description of techniques used in methods, systems, and computer program products for implementing failover and resume when using ordered sequences in a multi-instance database environment.

The embodiments commence by instantiating a first database instance initially to serve as an active instance, then instantiating a second database instance to serve as an instance of one or more passive instances. The active database instance establishes mastership over a sequence (e.g., a plurality of symbols to be accessed in a particular order) and then processes requests for the 'next' symbol by accessing a shared sequence cache only after accessing a first instance semaphore. The active instance and the passive instance perform a protocol such that upon passive database detection of a failure of the active database, one of the passive database instances takes over mastership of the sequence cache, and then proceeds to satisfy sequence value requests, again using a semaphore to ensure sequential access to the shared sequence cache. The particular order is observed in spite of the failure.

Further details of aspects, objectives, and advantages of the disclosure are described below in the detailed description, drawings, and claims. Both the foregoing general description of the background and the following detailed description are exemplary and explanatory, and are not intended to be limiting as to the scope of the claims.

DETAILED DESCRIPTION

Some embodiments of the present disclosure are directed to an improved approach for implementing failover and resume when using ordered sequences in a multi-instance database environment.

As mentioned above, many application environments operate on mission-critical data, and resilience and redundancy are provided by implementing database environments, such as a clustered database environment (referred to herein illustratively as "Real Application Clusters" or RAC) comprising multiple instances of a database, each of which instances might share at least some of the same components as provided in the environment. When a failure does occur, some mission-critical applications need a "graceful" failover (and resume) from one database instance to another database instance.

Figure 1A:
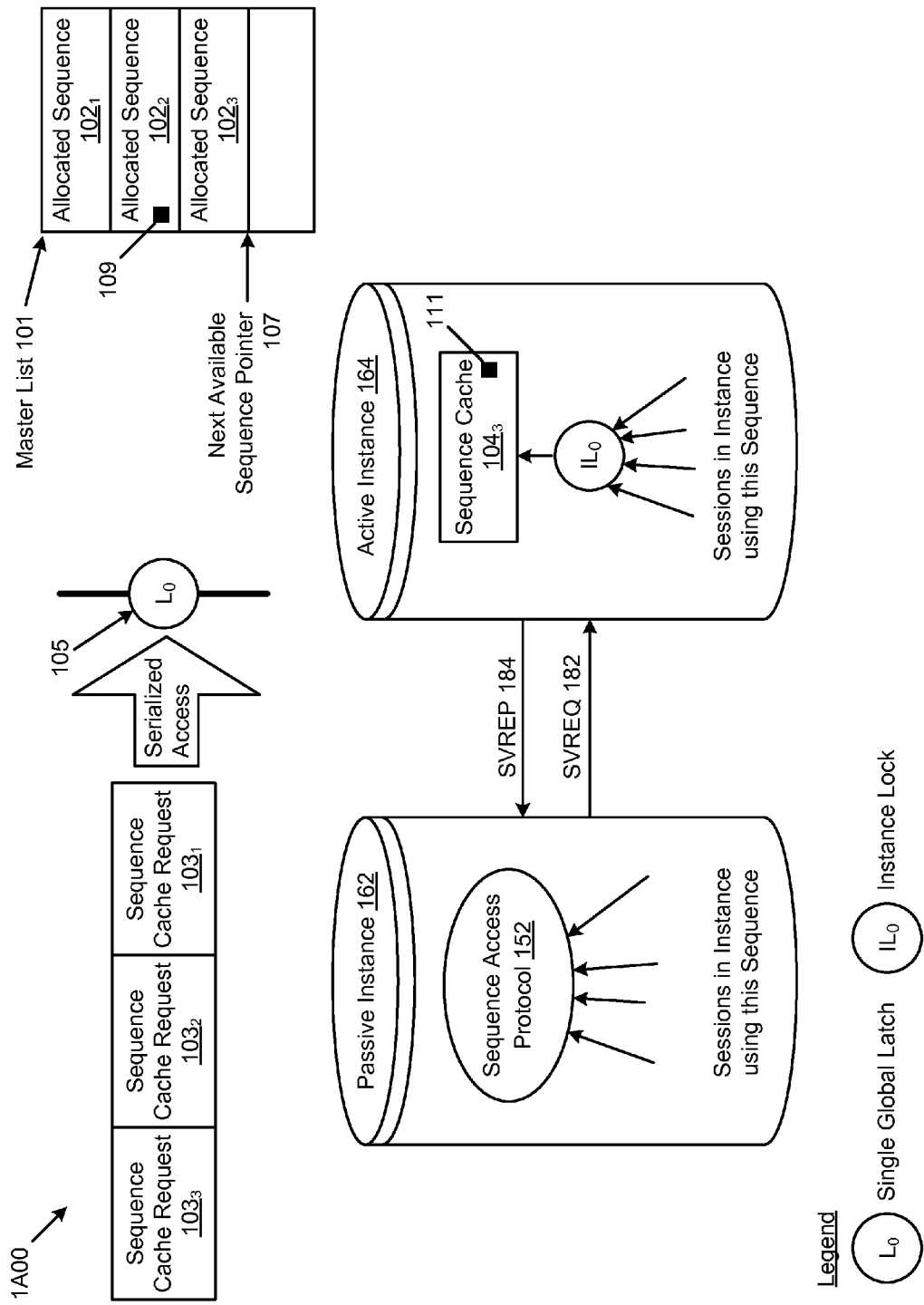
FIG. 1A depicts a diagrammatic representation of a system for implementing failover and resume when using ordered sequences in a multi-instance database environment, according to some embodiments.

A clustered database system may consist of multiple instances of the database, each of which shares the same resources of the database such as storage, etc. Some mission-critical applications need graceful failover from an active database instance to a passive database instance in a multi-instance RAC environment with ordered sequences. The techniques disclosed herein eliminate or reduce performance degradation under most conditions including before, during, and after a failover. More particularly, the techniques disclosed herein serve to manage ordered sequence caches between an active database instance and one or more passive database instances. Performance issues due to heavy-weight legacy semaphores used to avoid sequence cache collisions (e.g., to guarantee the intended order of the sequence values) are addressed by the techniques herein.
Architecture Overview FIG. 1A depicts a diagrammatic representation of a system for implementing failover and resume when using ordered sequences in a multi-instance database environment. As an option, the present system 1A00 may be implemented in the context of the architecture and functionality of the embodiments described herein. Also, the system 1A00 or any aspect therein may be implemented in any desired environment.

FIG. 1A illustrates an environment implementing one possible system 1A00 for a graceful failover and resume when using ordered sequences in a multi-instance database environment. As shown, the active database instance (e.g., active instance 164) is the "master" of the sequence (e.g., sequence cache $104_3$), and the master is responsible for the distribution of the sequence values (e.g., sequence value 111) to all sessions within the environment. For example, the master is responsible for distribution of sequence values to sessions within itself, as well as to all other sessions within the passive database instances (e.g., passive instances 162) that are using a given sequence. The sequence cache $104_3$ only resides in the active database instance, which is guarded by a light-weight instance semaphore/lock (e.g., $IL_0$). The access guards operate in such a way that the sequence values are delivered in the desired order independent of the specific timing of any request or next request.

During the failover period (see FIG. 1B), the passive database instance starts requesting sequence values (see sequence value request message SVREQ 182) from the active instance. The active instance responds to a sequence value request message SVREQ 182 with a sequence value reply SVREP 184. This exchange continues until the original active database instance dies (e.g., fails), at which time the original passive database instance assumes mastership of the given sequence and the original passive database instance (e.g., passive instance 162) becomes active. The passive instance 162 observes a sequence access protocol 152 in conjunction with the active instance 164. The original active database instance (e.g., active instance 164) may come back online as a passive database instance after it is resurrected from its failed state.

Continuing the discussion of operations within system 1A00, a database instance can issue requests for a sequence (e.g., sequence cache request $103_1$, sequence cache request $103_2$, sequence cache request $103_3$, etc.) and, as shown, the requests are queued for access to a master list 101, in which master list any number of allocated sequences can be recorded (e.g., allocated sequence $102_1$, allocated sequence $102_2$, allocated sequence $102_3$, etc.). Such a master list, or variants, can be established during code development time, or such a master list, or variants, can be established dynamically when an instance of a database is defined. An allocated sequence comprises an ordered list of symbols 109 (e.g., number strings, integer values, etc.).

Within a set of database instances, access to an allocated sequence is granted only via a semaphore (e.g., the single global latch 105, shown as $L_0$) and, thus, requests are handled serially (though not necessarily in any particular order). Also shown in FIG. 1A is a next available sequence pointer 107, pointing a location in the master list 101, which location refers to the next unallocated sequence number in the master list. Access to a next available sequence pointer, as well as to the next unallocated sequence, is granted only via the single global latch $L_0$.

In this embodiment, multiple sequences can be allocated, and a given allocated sequence can be stored in a sequence cache (e.g., sequence cache $104_3$, etc.), the sequence cache being provided in a segment (or in multiple segments) comprised of volatile or non-volatile memory locations. Requests for an individual sequence of values (e.g., 0001, 0002, etc.) can be made by any session in an instance, and such requests are serialized by use of the single global latch. While the architecture of system 1A00 serves to serialize access to the next available sequence pointer 107 (which records a "high watermark"), as well as to the next unallocated sequence, such serialized access is still granted only via the single global latch $L_0$, which can result in many requests being queued up and waiting. Additional techniques (as disclosed herein) can be implemented for graceful handling of failover and resume operations when using ordered sequences in a multi-instance database environment.

Figure 1B:
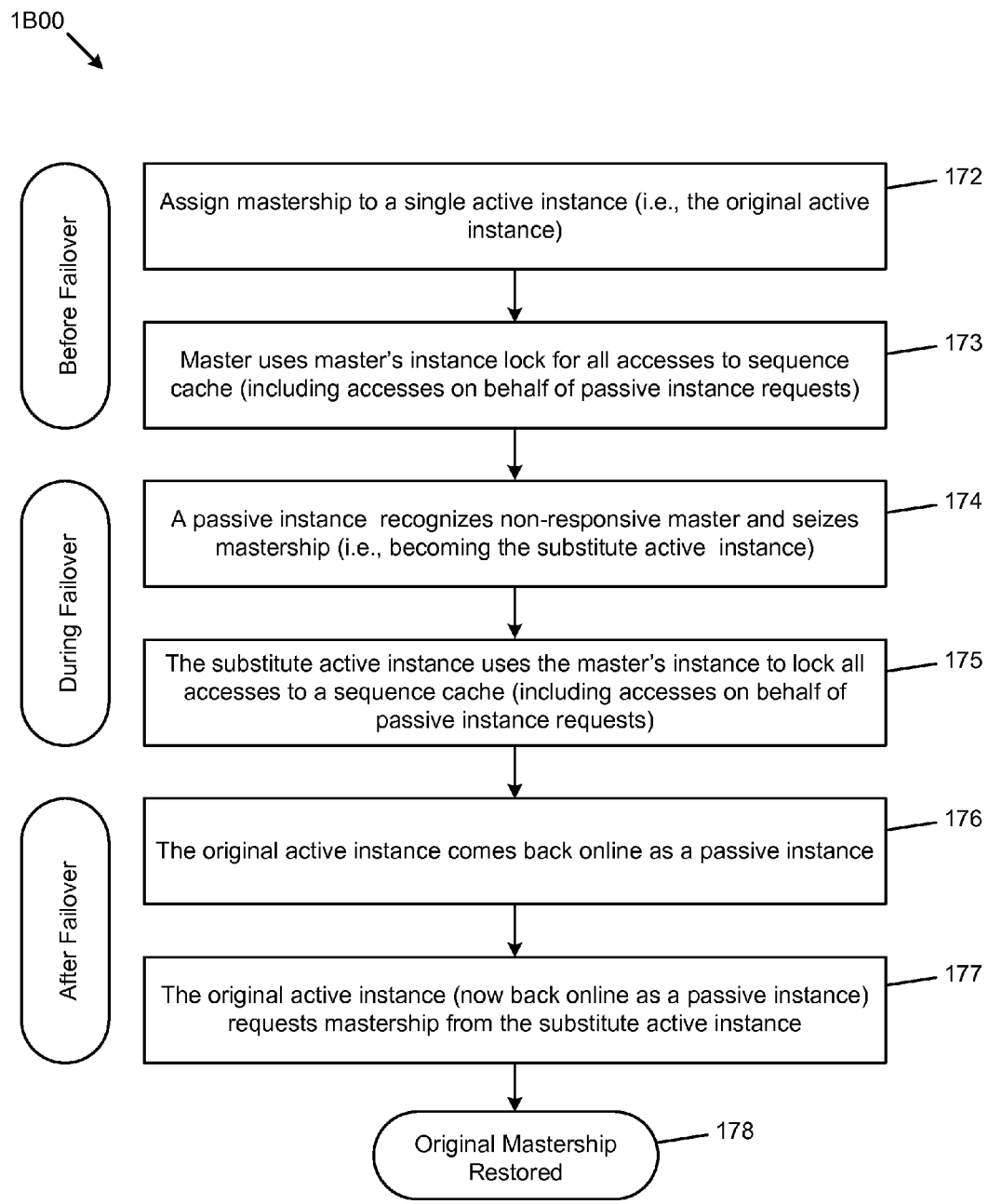
FIG. 1B is a flow chart of phases within a system for implementing failover and resume when using ordered sequences in a multi-instance database environment, according to some embodiments.

FIG. 1B is a flow chart of phases within a system for implementing failover and resume when using ordered sequences in a multi-instance database environment. As option, the present system 1B00 may be implemented in the context of the architecture and functionality of the embodiments described herein. Also, the system 1B00 or any aspect therein may be implemented in any desired environment.

The operation flow of the presented approach for a graceful failover with an ordered sequence in a multi-instance database system is illustrated in FIG. 1B. The operation flow has three phases. As shown (see the Before Failover indication), mastership is assigned to a single active instance (see operation 172). The active instance is the master of the sequence and is responsible for distribution of the sequence values within the environment. An instance semaphore (e.g., instance lock $IL_0$, see FIG. 1A) is used to guard the sequence cache on an active database instance to make sure that the sequence values are delivered in order (see operation 173).

During a failover (see the During Failover indication), the active database instance continues to act according to the mastership role until the active database instance actually fails, e.g., such that it can no longer serve according to the mastership role. During this period, the passive database instance requests sequence values from the active database instance. Once the passive instance discovers that the master of the given sequence is no longer responsive (e.g., that the master of the given sequence is no longer responsive while performing the sequence access protocol 152), then the passive database instance takes on the role of the (former) active database instance (see operation 174). Having taken on the mastership role, the newly active instance becomes responsible for the distribution of the sequence values within the environment. An instance semaphore is used to guard the sequence cache of the newly active database instance to make sure that the sequence values are delivered in order (see operation 175).

After the failover (see the After Failover indication), the original active database instance that had failed may come back online as a passive database instance (see operation 176) and, upon coming online, a passive database instance observes a bring-up protocol. At some point during the bring-up protocol, the original passive database instance becomes active and (again) takes on the mastership role of the given sequence to make sure the sequence values are given out in order (see operation 177). At this juncture, the original mastership is restored (see state 178).

Figure 1C:
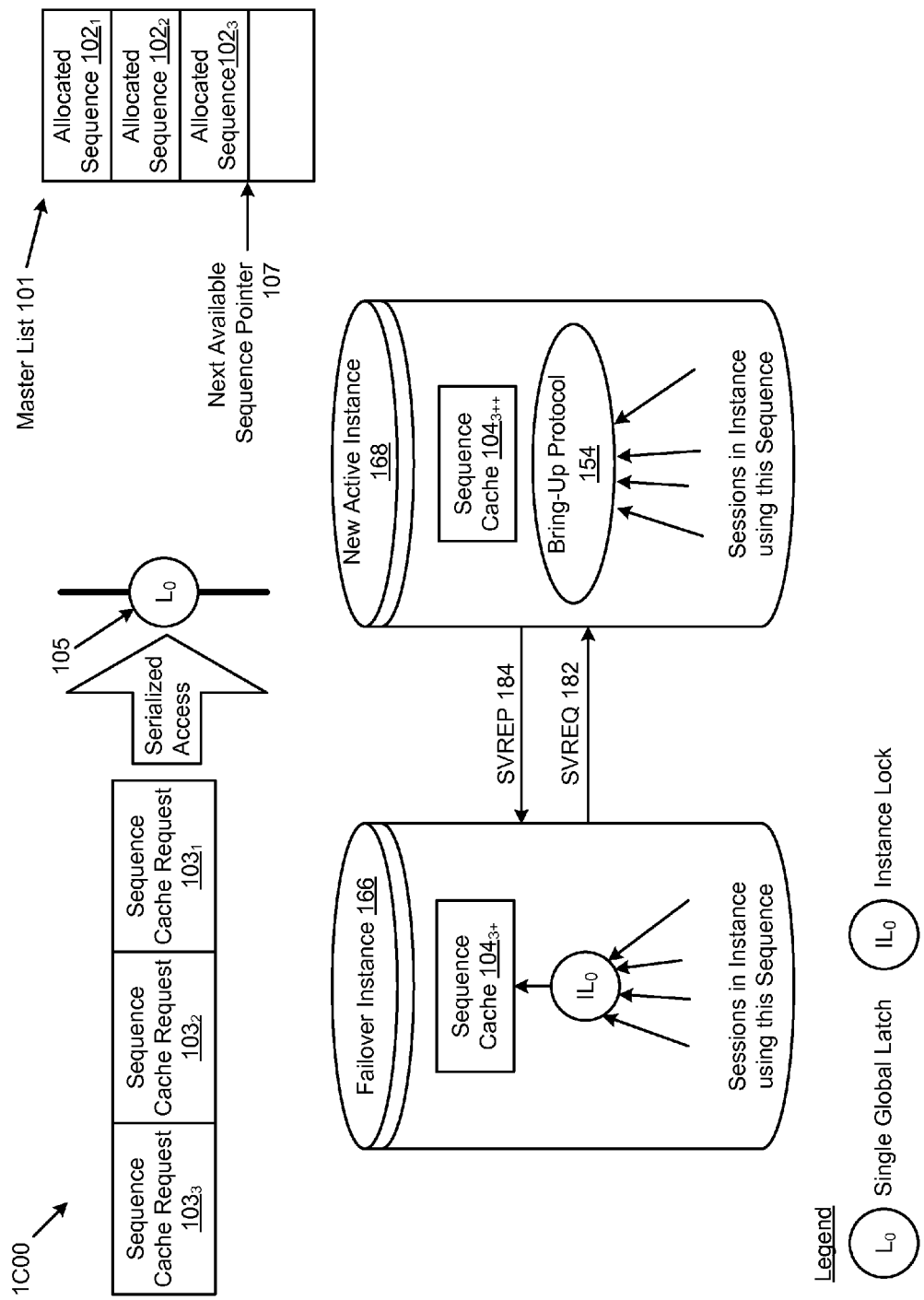
FIG. 1C depicts a diagrammatic representation of a system for implementing failover and resume when using ordered sequences in a multi-instance database environment, according to some embodiments.

FIG. 1C depicts a diagrammatic representation of a system for implementing failover and resume when using ordered sequences in a multi-instance database environment. As option, the present system 1C00 may be implemented in the context of the architecture and functionality of the embodiments described herein. Also, the system 1C00 or any aspect therein may be implemented in any desired environment.

As earlier indicated, at any moment in time, at most one (non-failed) database instance in an environment is designated as the master of a particular sequence. In exemplary embodiments, the mastership information of a sequence is stored in its corresponding sequence dictionary entry (e.g., allocated sequence $102_1$, allocated sequence $102_2$, allocated sequence $102_3$, etc.). To safeguard the allocation of sequence values from the sequence cache between all sessions running within the environment, the master instance uses an instance semaphore (e.g., instance lock $IL_0$) instead of a single global latch. The single global latch is used for access to the master list (e.g., for access to a next allocated sequence) and the corresponding update of the next available sequence pointer 107.

During the failover period, in which some sessions are started on the passive instance, requests from the passive instance are sent to the master of the sequence (the active instance) to get the next sequence value when sequence values are needed for sessions running on the passive instance. When the sequence master instance dies (e.g., when the original active instance fails), whichever passive instance requests a next sequence value (e.g., using sequence value request message SVREQ 182) will check the mastership attributes that are stored in the requested sequence cache. If the sequence master instance of the requested sequence is no longer active (e.g., it had died), then the passive instance will try to access a corresponding sequence entry to declare itself as the master of that sequence. One possible approach is to have the master instance identification information of a given sequence (e.g., instance X) to be stored in the sequence entry table that is guarded by a single global latch. Please note that there might be several passive instances contending for the mastership of the given sequence, whoever gets the global latch will have the chance to update the sequence mastership information to declare itself as the master instance of the given sequence. One can also use distributed lock management (DLM) for the management and switchover of the mastership of a given sequence.

At or near the end of the failover sequence, the (former) passive instance 162 (of FIG. 1A) becomes the new master (e.g., see failover instance 166 of FIG. 1C), and the sequence cache (e.g., sequence cache $104_{3+}$) comes under the control of the new master. Also, at some point after the end of the failover sequence, the (former) master (e.g., see active instance 164 in FIG. 1A) can be brought back online, initially as a passive instance, and at some point during the passive instance's observation of the bring-up protocol 154, the original active database instance once again becomes active (see new active instance 168) and (again) takes on the mastership role of the given the sequence cache (e.g., sequence cache $104_{3++}$) to make sure the sequence values that are given out are in order. At this juncture, the original mastership has been restored under control of the new active instance 168.

Figure 2:
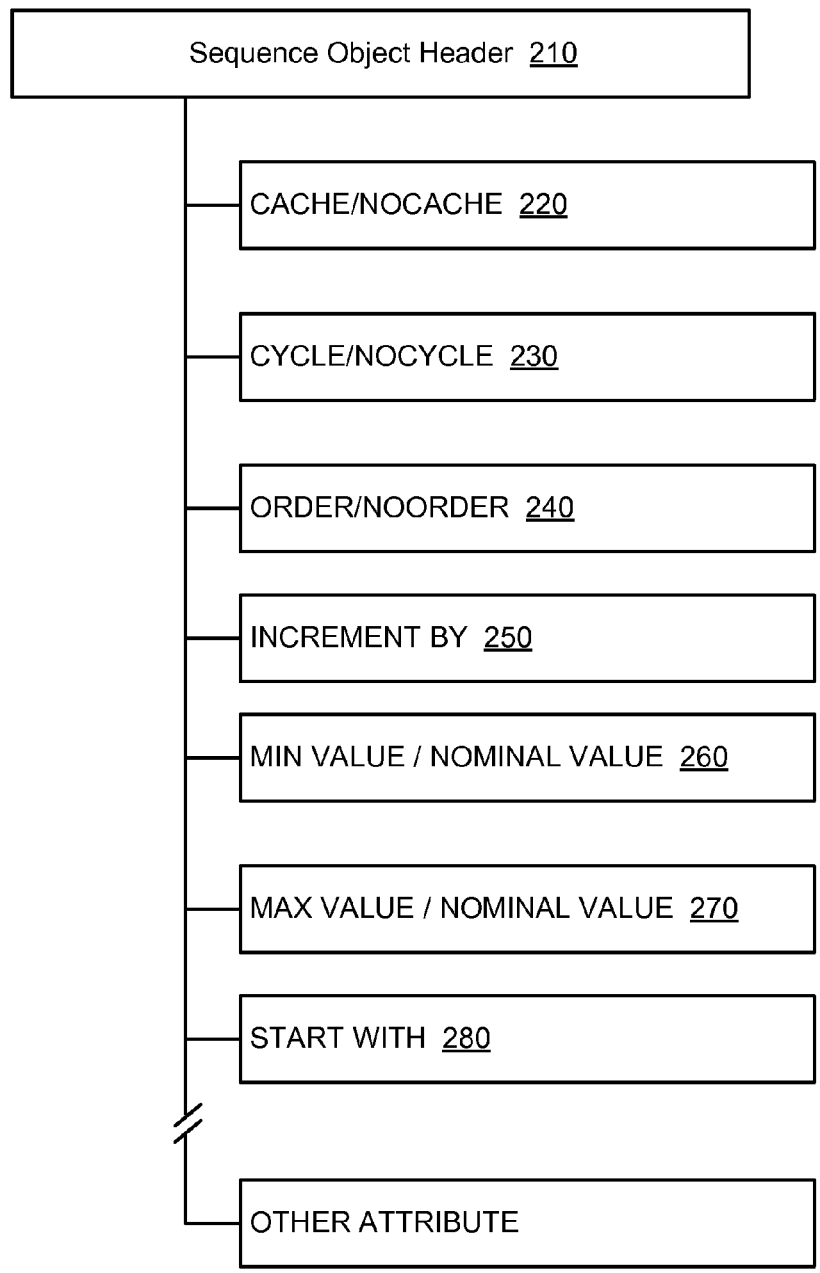
FIG. 2 is a diagram of a sequence object for implementing failover and resume when using ordered sequences in a multi-instance database environment, according to some embodiments.

FIG. 2 is a diagram of a sequence object for implementing failover and resume when using ordered sequences in a multi-instance database environment. As option, the present sequence object 200 may be implemented in the context of the architecture and functionality of the embodiments described herein. Also, the sequence object 200 or any aspect therein may be implemented in any desired environment.

As used herein, a "sequence" is a user created database object that can be shared by multiple users to generate unique identifiers (e.g., integers, values, symbols, etc.). As shown, the sequence database object has attributes as in Table 1:

TABLE 1

Attributes

| Data Element | Description |
| --- | --- |
| Sequence Object Header 210 | Metadata pertaining to the object and its constituent components. Can apply to any one or more instances of the object. |
| CACHE/ NOCACHE 220 | Boolean Flag: Specifies if the instance of the object is cached (or not). |
| CYCLE/NOCYCLE 230 | Boolean Flag: Specifies if the instance of the object supports recycling (reusing) sequence identifiers (or not). |
| ORDER/ NOORDER 240 | Boolean Flag: Specifies if the instance of the object enforces ordering (or not). |
| INCREMENT BY 250 | Boolean Flag: Specifies if the instance of the object enforces algorithmic incrementation (or not). |
| MIN VALUE/ NOMINAL VALUE 260 | Value (e.g., integer value): Specifies the minimum value to use in an algorithmic incrementation. |
| MIN VALUE/ NOMINAL VALUE 270 | Value (e.g., integer value): Specifies the maximum value to use in an algorithmic incrementation. |
| START WITH 280 | Value (e.g., integer value): Specifies the initial value to use in an algorithmic incrementation. |

The database objects and techniques of the embodiments as shown and described above can be applied to database environments comprising an "active instance" and one or more "passive instances".

Figure 3:
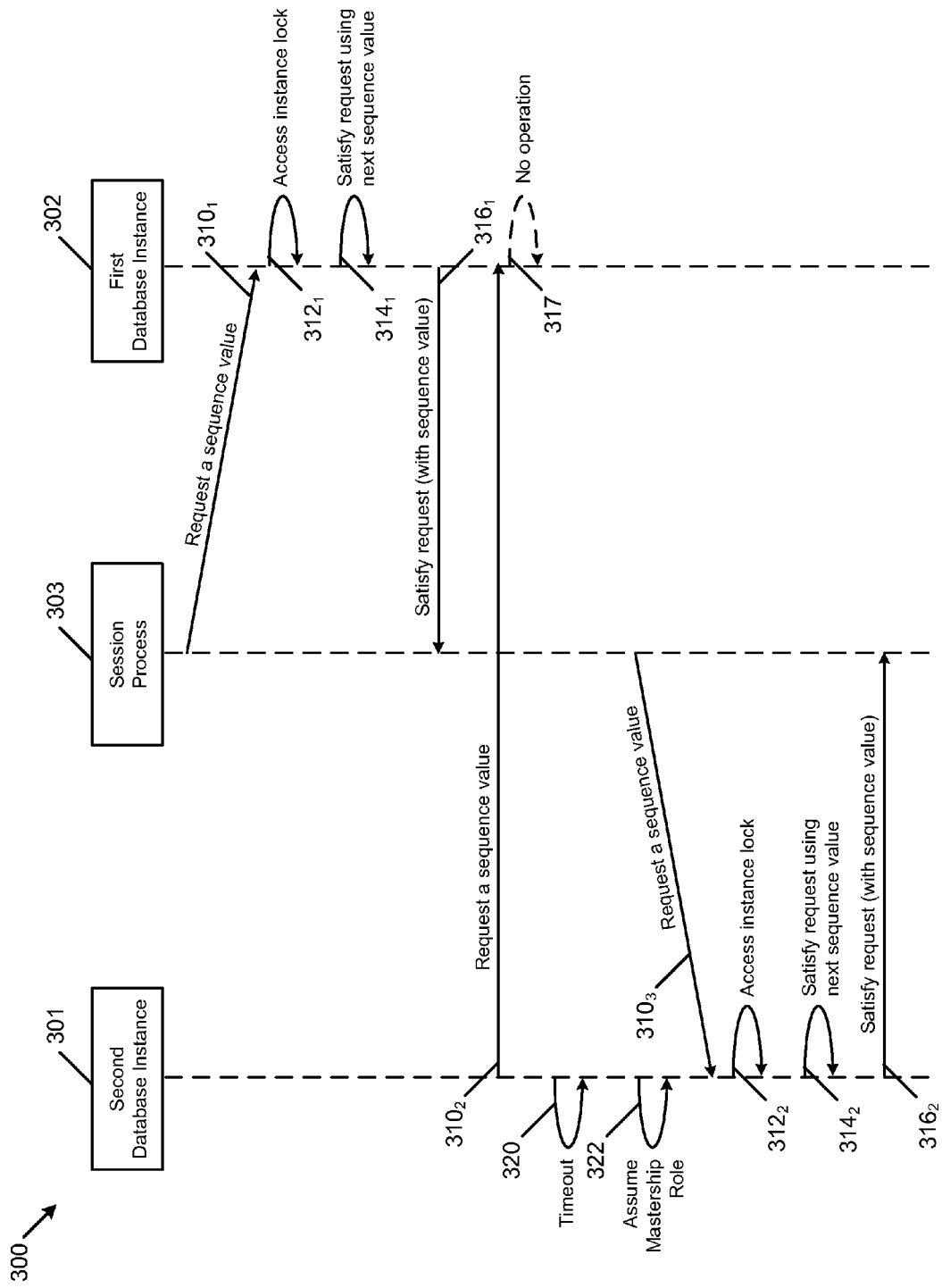
FIG. 3 is a sequence chart of a protocol for implementing failover and resume when using ordered sequences in a multi-instance database environment, according to some embodiments.

FIG. 3 is a sequence chart of an approach for implementing failover and resume when using ordered sequences in a multi-instance database environment. As option, the present protocol 300 may be implemented in the context of the architecture and functionality of the embodiments described herein. Also, the protocol 300 between an active instance and a passive instance or any aspect therein may be implemented in any desired environment.

As shown, an active instance upon which multiple sessions that are using a given sequence are running is designated as the master of the given sequence (see first database instance 302). The mastership information of a particular sequence is stored in a corresponding sequence dictionary entry. The active instance connects to one or more passive instances (see second database instance 301). The active instance (master of the sequence) is in charge of giving out sequence values to requestors (see session process 303), and does so in response to a sequence value request message (see message $310_1$). Such a sequence value request message can be sent from any session in the environment, and any number of sequence value request messages can be sent asynchronously. The first database instance responds to such a sequence value request by accessing its instance semaphore (see operation $312_1$) and then receiving the next sequence value (see operation $314_1$) for use to satisfy the sequence value request with a sequence value (see message $316_1$). This exchange continues until the active database instance fails, and is unable to respond (see operation 317, that is a "No operation") to a sequence value request message (see message $310_2$), which "no operation" by the active database instance causes the passive instance to timeout based on a timeout value (see operation 320). The passive instance then assumes the aforementioned mastership role (see operation 322). The protocol, serves for transferring mastership from the first database (e.g., an active instance) to the second database (e.g., a passive instance) after the second database determines the first database has failed (again, see operation 310). Then having assumed the mastership role, the second database instance responds to incoming sequence value requests by accessing its instance semaphore (see operation $312_2$) and then accessing the next sequence value (see operation $314_2$), for use to satisfy the sequence value request with a sequence value (see message $316_2$).

Additional Embodiments of the Disclosure

Figure 4:
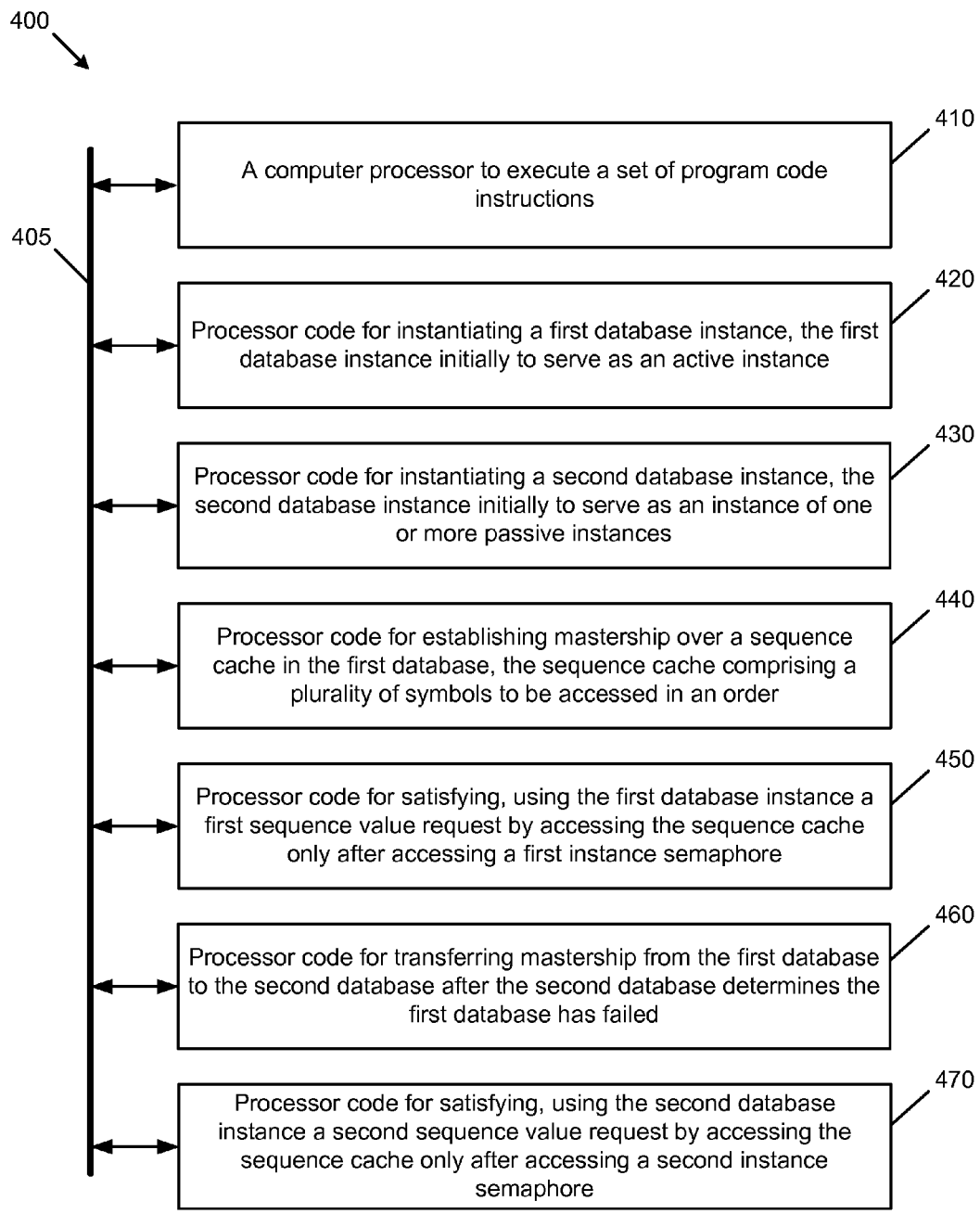
FIG. 4 depicts a block diagram of a system to perform certain functions of a computer system, according to some embodiments.

FIG. 4 depicts a block diagram of a system to perform certain functions of a computer system. As an option, the present system 400 may be implemented in the context of the architecture and functionality of the embodiments described herein. Of course, however, the system 400 or any operation therein may be carried out in any desired environment. As shown, system 400 comprises at least one processor and at least one memory, the memory serving to store program instructions corresponding to the operations of the system. As shown, an operation can be implemented in whole or in part using program instructions accessible by a module. The modules are connected to a communication path 405, and any operation can communicate with other operations over communication path 405. The modules of the system can, individually or in combination, perform method operations within system 400. Any operations performed within system 400 may be performed in any order unless as may be specified in the claims. The embodiment of FIG. 4 implements a portion of a computer system, shown as system 400, comprising a computer processor to execute a set of program code instructions (see module 410) and modules for accessing memory to hold program code instructions to perform: instantiating a first database instance, the first database instance initially to serve as an active instance (see module 420); instantiating a second database instance, the second database instance initially to serve as an instance of one or more passive instances (see module 430); establishing mastership over a sequence cache in the first database, the sequence cache comprising a plurality of symbols to be accessed in an order (see module 440); satisfying, using the first database instance a first sequence value request by accessing the sequence cache only after accessing a first instance semaphore (see module 450); transferring mastership from the first database to the second database after the second database determines the first database has failed (see module 460); and satisfying, using the second database instance a second sequence value request by accessing the sequence cache only after accessing a second instance semaphore (see module 470).

System Architecture Overview

Figure 5:
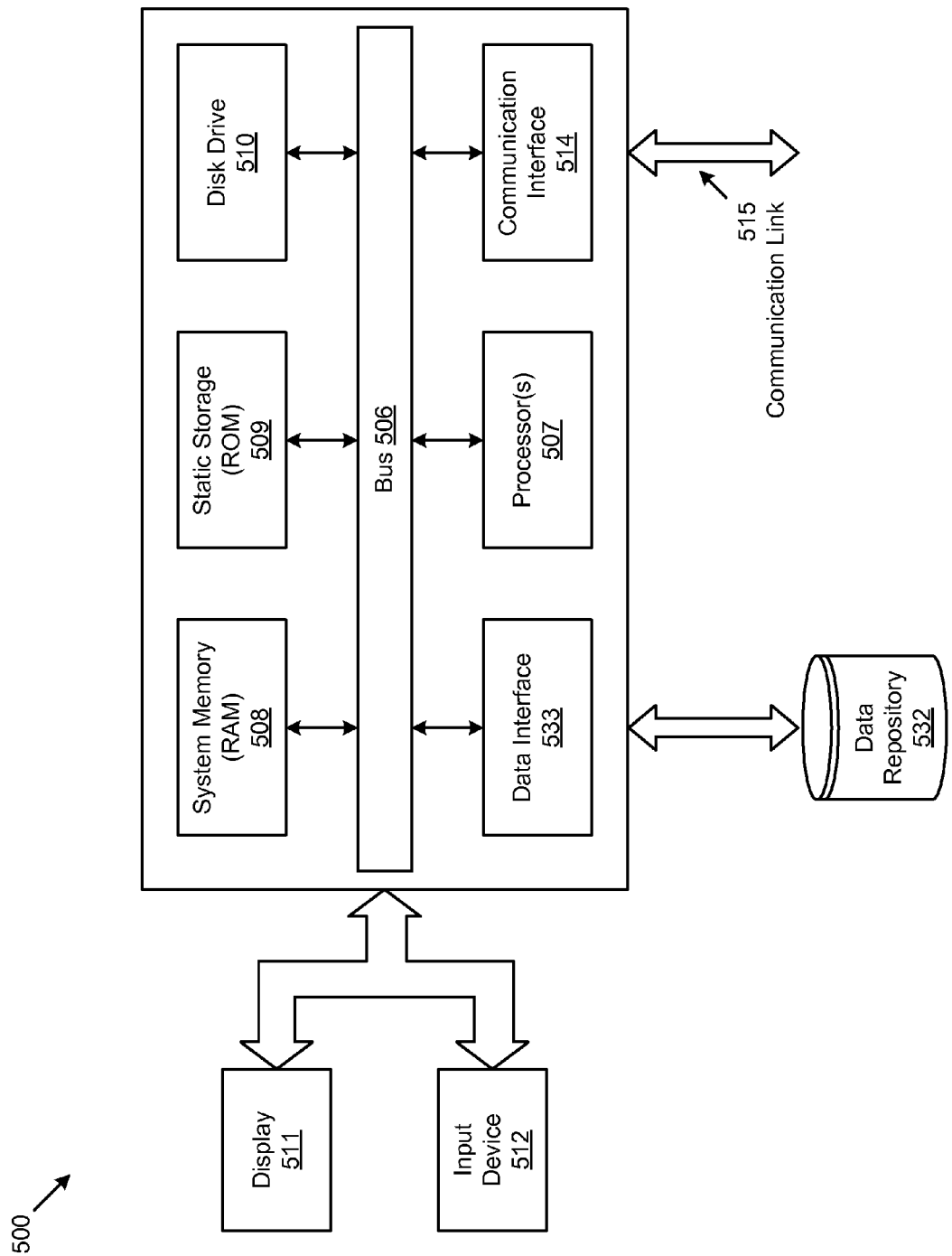
FIG. 5 depicts a block diagram of an instance of a computer system suitable for implementing an embodiment of the present disclosure.

FIG. 5 depicts a block diagram of an instance of a computer system 500 suitable for implementing an embodiment of the present disclosure. Computer system 500 includes a bus 506 or other communication mechanism for communicating information, which interconnects subsystems and devices, such as a processor 507, a system memory 508 (e.g., RAM), a static storage device 509 (e.g., ROM), a disk drive 510 (e.g., magnetic or optical), a data interface 533, a communication interface 514 (e.g., modem or Ethernet card), a display 511 (e.g., CRT or LCD), input devices 512 (e.g., keyboard, cursor control), and an external data repository 532.

According to one embodiment of the disclosure, computer system 500 performs specific operations by processor 507 executing one or more sequences of one or more instructions contained in system memory 508. Such instructions may be read into system memory 508 from another computer readable/usable medium, such as a static storage device 509 or a disk drive 510. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 507 for execution. Such a medium may take many forms, including but not limited to, non-volatile media and volatile media. Non-volatile media includes, for example, optical or magnetic disks, such as disk drive 510. Volatile media includes dynamic memory, such as system memory 508.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 500. According to other embodiments of the disclosure, two or more computer systems 500 coupled by a communication link 515 (e.g., LAN, PTSN, or wireless network) may perform the sequence of instructions required to practice the disclosure in coordination with one another.

Computer system 500 may transmit and receive messages, data, and instructions, including program, i.e., application code, through communication link 515 and communication interface 514. Received program code may be executed by processor 507 as it is received, and/or stored in disk drive 510 or other non-volatile storage for later execution. Computer system 500 may communicate through a data interface 533 to a database on an external data repository 532. A module as used herein can be implemented using any mix of any portions of the system memory 508, and any extent of hard-wired circuitry including hard-wired circuitry embodied as a processor 507

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

What is claimed is:

1. A computer implemented method for implementing failover when using ordered sequences in a multi-instance database environment, the method comprising:
instantiating a plurality of database instances of a database, wherein the plurality of database instances comprises at least a first database instance initially designated as an active instance, and one or more other database instances initially designated as passive instances;
identifying a master sequence associated with the database, wherein access to the master sequence is controlled through a global lock;
allocating one or more portions of the master sequence to form a sequence cache, wherein the sequence cache comprises a plurality of symbols to be accessed in an order for satisfying sequence value requests from one or more sessions associated with the first database instance and the one or more other database instances;
designating the first database instance as master of the sequence cache, such that access to the sequence cache is controlled through a first instance lock on the first database instance;
satisfying a first sequence value request by accessing the sequence cache through the first instance lock on the first database instance;
using a second database instance to recognize that the first database instance has failed, where the second database instance that recognized that the first database instance has failed is designated as master of the sequence cache, such that access to the sequence cache is controlled through a second instance lock on the second database instance; and
satisfying a second sequence value request by accessing the sequence cache through the second instance lock on the second database instance.

2. The method of claim 1, further comprising transferring mastership from the second database instance to a third database instance.

3. The method of claim 2, further comprising satisfying, using the third database instance, a third sequence value request by accessing the sequence cache only after accessing a third instance semaphore.

4. The method of claim 3, wherein the first database instance is the same as the third database instance.

5. The method of claim 1, wherein the second database instance determines the first database instance has failed based on a timeout value.

6. The method of claim 1, wherein the first instance lock is an instance semaphore.

7. A computer system for implementing failover when using ordered sequences in a multi-instance database environment, comprising:
a computer processor to execute a set of program code instructions; and
a memory to hold the program code instructions, in which the program code instructions comprise program code to perform:
instantiating a plurality of database instances of a database, wherein the plurality of database instances comprises at least a first database instance initially designated as an active instance, and one or more other database instances initially designated as passive instances;
identifying a master sequence associated with the database, wherein access to the master sequence is controlled through a global lock;
allocating one or more portions of the master sequence to form a sequence cache, wherein the sequence cache comprises a plurality of symbols to be accessed in an order for satisfying sequence value requests from one or more sessions associated with the first database instance and the one or more other database instances;

designating the first database instance as master of the sequence cache, such that access to the sequence cache is controlled through a first instance lock on the first database instance;

satisfying a first sequence value request by accessing the sequence cache through the first instance lock on the first database instance;

using a second database instance to recognize that the first database instance has failed, where the second database instance that recognized that the first database instance has failed is designated as master of the sequence cache, such that access to the sequence cache is controlled through a second instance lock on the second database instance; and satisfying a second sequence value request by accessing the sequence cache through the second instance lock on the second database instance.

8. The computer system of claim 7, wherein the program code instructions further comprise instructions to perform transferring mastership from the second database instance to a third database instance.

9. The computer system of claim 8, wherein the program code instructions further comprise instructions to perform satisfying, using the third database instance, a third sequence value request by accessing the sequence cache only after accessing a third instance semaphore.

10. The computer system of claim 9, wherein the first database instance is the same as the third database instance.

11. The computer system of claim 7, wherein the second database instance determines the first database instance has failed based on a timeout value.

12. The computer system of claim 7, wherein the first instance lock is an instance semaphore.

13. A computer program product embodied in a non-transitory computer readable medium, the computer readable medium having stored thereon a sequence of instructions which, when executed by a processor causes the processor to execute a method to implement implementing failover when using ordered sequences in a multi-instance database environment, the method comprising:

instantiating a plurality of database instances of a database, wherein the plurality of database instances comprises at least a first database instance initially designated as an active instance, and one or more other database instances initially designated as passive instances;

identifying a master sequence associated with the database, wherein access to the master sequence is controlled through a global lock;

allocating one or more portions of the master sequence to form a sequence cache, wherein the sequence cache comprises a plurality of symbols to be accessed in an order for satisfying sequence value requests from one or more sessions associated with the first database instance and the one or more other database instances;

designating the first database instance as master of the sequence cache, such that access to the sequence cache is controlled through a first instance lock on the first database instance;

satisfying a first sequence value request by accessing the sequence cache through the first instance lock on the first database instance;

using a second database instance to recognize that the first database instance has failed, where the second database instance that recognized that the first database instance has failed is designated as master of the sequence cache, such that access to the sequence cache is controlled through a second instance lock on the second database instance; and satisfying a second sequence value request by accessing the sequence cache through the second instance lock on the second database instance.

14. The computer program product of claim 13, wherein the method further comprises transferring mastership from the second database instance to a third database instance.

15. The computer program product of claim 14, wherein the method further comprises satisfying, using the third database instance, a third sequence value request by accessing the sequence cache only after accessing a third instance semaphore.

16. The computer program product of claim 15, wherein the first database instance is the same as the third database instance.

17. The computer program product of claim 13, wherein the first instance lock is an instance semaphore.

* * * * *

UNITED STATES PATENT AND TRADEMARK OFFICE
CERTIFICATE OF CORRECTION

Page 1 of 1

PATENT NO.       : 9,910,893 B2
APPLICATION NO.  : 13/309300
DATED            : March 6, 2018
INVENTOR(S)      : Li et al.

It is certified that error appears in the above-identified patent and that said Letters Patent is hereby corrected as shown below:

In the Specification

In Column 9, Line 47, after "507" insert -- . --.

Signed and Sealed this
Twenty-first Day of August, 2018

Andrei Iancu
*Director of the United States Patent and Trademark Office*